United States Patent [19]
Martin

[11] 3,984,731
[45] Oct. 5, 1976

[54] METHOD FOR NEUTRALIZING STATIC ELECTRICITY
[75] Inventor: Edwin B. Martin, Greenville, S.C.
[73] Assignee: Mar-Chem, Incorporated, Greenville, S.C.
[22] Filed: Aug. 8, 1975
[21] Appl. No.: 603,166

Related U.S. Application Data
[62] Division of Ser. No. 404,867, Oct. 10, 1973, Pat. No. 3,939,080.

[52] U.S. Cl. .................................. 317/2 R; 55/84
[51] Int. Cl.² ..................................... H05F 3/00
[58] Field of Search ............... 317/2 R, 2 J, 262 AE; 55/84, 89

[56] References Cited
UNITED STATES PATENTS
3,123,641   3/1964   Longley .............................. 317/2 R

*Primary Examiner*—Harry Moose
*Attorney, Agent, or Firm*—Bell, Seltzer, Park & Gibson

[57] ABSTRACT

Static electricity otherwise present in a room to which an air washer delivers a flow of air is neutralized by treatment of water circulating in an air washer with a composition which includes dodecylbenzyl-triethyl-ammonium chloride.

6 Claims, No Drawings

METHOD FOR NEUTRALIZING STATIC ELECTRICITY

This application is a divisional application from copending application Ser. No. 404,867, filed Oct. 10, 1973, now U.S. Pat. No. 3,939,080.

In certain industries, the presence of static electricity in a room where certain processes are carried out has a decidedly adverse effect on the quality of the products or the smoothness with which the processes go forward. One particular example of such an industry is the textile industry, in which textile fibers are processed into textile yarns and textile fabrics. Particularly in the spinning of fiber into yarn, static electricity interferes with smooth processing of the fiber. Manifestly, the neutralization of static electricity under such circumstances would be highly desirable.

Certain industries which have encountered difficulty with static electricity, and notably the textile industry, employ a type of air conditioning equipment known as an "air washer" in maintaining desired conditions. As herein used, the term "air washer" refers to spray equipment in which liquid (conventionally water) is sprayed into an air flow. Such spray equipment or air washers may, for example only, include adiabatic water sprays for evaporative cooling and chilled water sprays which may both dehumidify and cool. Conventionally, an air washer includes a reservoir or tank in which a body of water is retained, a pump for circulating the body of water from the reservoir to a spray manifold, sprays through which the water is discharged into an air flow, separator plates for removing drops of liquid from the air flow and returning them to the reservoir, and a make-up water supply for maintaining the recirculating body of water at a predetermined level within the reservoir. An alternate arrangement which is also used provides a sump tank in which chilled water is retained and remote air washer stations to which the water is circulated. Such air washers and their use in the textile industry are generally well known to persons skilled in the arts of air-conditioning and textile manufacturing. As here used, the term "air washer" means either of these alternate arrangements.

Having in mind the desirability of reducing static electricity and the use of air washers, it is an object of this invention to promote the neutralization of static electricity by treating a body of water recirculated in an air washer. In accomplishing this object of the present invention, the body of water recirculating in the air washer has a quantity of a quatenary ammonium compound mixed therein, in a concentration effective for reducing static electricity in a room to which the air washer delivers a flow of air.

Many air washer installations employ various materials as some portion of the air washer structure. For this reason, it has been found desirable in maintaining the efficiency of an air washer to incorporate into a composition in accordance with this invention a constituent which inhibits rust in the air washer. Accordingly, this invention contemplates the incorporation of an isopropanolamine for accomplishing that function.

Additionally, efficiency of recirculation of the body of water in an air washer is favored by reduction of foaming. To accomplish that end, it is preferred that the composition in accordance with this invention incorporate a silicone emulsion for inhibiting foam.

EXAMPLE I

To 10 gallons of a 50 percent (by weight) solution of dodecylbenzyl-triethyl-ammonium chloride in water was added 128 fluid ounces of a silicone emulsion defoamer and 256 fluid ounces of an isopropanolamine rust inhibitor. This mixture was then diluted with a quantity of water sufficient to produce 55 gallons and the resultant solution was fed continuously via a drip feeder arrangement into the reservoir of an air washer which contained approximately 18,000 gallons of water, with the feed rate being approximately 32 ounces per 24 hour period. The feed rate was directed at maintaining a level of approximately 100 parts per million of the solution fed into the air washer. An analysis of yarn breakage in a spinning room supplied with air delivered by the air washer revealed a reduction in ends down per thousand spindle hours following feeding of the composition into the air washer reservoir, which was attributed to improved neutralization of static electricity.

EXAMPLE II

To 10 gallons of a 50% (by weight) solution of dodecylbenzyl-triethyl-ammonium chloride in water was added 128 fluid ounces of a silicone emulsion for inhibiting foaming and 256 fluid ounces of an isopropanolamine for inhibiting rust. The resultant composition was then further diluted with water to produce a volume of 55 gallons, which was then fed by a drip feeder arrangement into the reservoir of an air washer which contained approximately 2,000 gallons of water. The drip feed arrangement was adjusted to deliver approximately 16 ounces per 24 hour period. Observation of the carding of textile fibers in a room to which air was delivered by the air washer indicated improved carding performance which was attributed to the reduction of static electricity.

These and other experiences suggest that compositions in accordance with this invention may be formulated by employing a quantity of 50% (by weight) dodecylbenzyl-triethyl-ammonium chloride and water in the range from about 8 gallons to about 30 gallons into which are mixed isopropanolamines for inhibiting rust in a range from about 128 fluid ounces to about 256 fluid ounces and a silicone emulsion for inhibiting foaming in the range from about 128 fluid ounces to about 256 fluid ounces. This composition may then, if desired, be diluted to a standard package measure such as 55 gallons for delivery and use. The composition is then delivered in effective quantities into the reservoir or tank of an air-washer system either at a central sump or at an individual station.

In the specification, there has been set forth a preferred embodiment of the invention, and although specific terms are employed, they are used in a generic and descriptive sense only and not for purposes of limitation.

That which is claimed is:

1. A method of neutralizing static electricity in a room to which an air washer delivers a flow of air and comprising the steps of preparing a solution of water and dodecylbenzyl-triethyl-ammonium chloride and mixing into a body of water recirculated in the air washer a quantity of prepared solution effective for reducing static electricity in the room.

2. A method according to claim 1 wherein the preparing of the solution comprises proportioning the dodecylbenzyl-triethyl-ammonium chloride to amount to about fifty percent by weight of the solution.

3. A method according to claim 1 wherein the preparing of the solution comprises incorporating an isopropanolamine for inhibiting rust in the air washer.

4. A method according to claim 1 wherein the preparing of the solution comprises incorporating a silicone emulsion for inhibiting foaming in the air washer.

5. A method according to claim 1 wherein the preparing of the solution comprises incorporating an isopropanolamine for inhibiting rust in the air washer and a silicone emulsion for inhibiting foaming in the air washer.

6. A method according to claim 1 wherein the mixing of the solution with the body of water comprises delivering small quantities of the solution into the body of water at frequent intervals for maintaining a substantially consistent concentration of dodecylbenzyl-triethyl-ammonium chloride in the body of water.

* * * * *